United States Patent [19]

DeCarlo et al.

[11] 4,377,091

[45] Mar. 22, 1983

[54] VERTICAL AXIS TURBINE FLOWMETER

[75] Inventors: Joseph P. DeCarlo, Wrentham, Mass.; Bernard R. Melancon, Warwick, R.I.

[73] Assignee: The Foxboro Company, Foxboro, Mass.

[21] Appl. No.: 239,786

[22] Filed: Mar. 2, 1981

[51] Int. Cl.³ .............................................. G01F 1/05
[52] U.S. Cl. .............................. 73/861.87; 73/861.85
[58] Field of Search ........... 73/272 R, 861.79, 861.81, 73/861.85, 861.87, 861.88; 415/201; 416/176 A, 197 A

[56] References Cited

U.S. PATENT DOCUMENTS

| 1,100,332 | 6/1914 | Smith ................................ 416/197 |
| 4,293,274 | 10/1981 | Gillman ............................ 416/197 |

FOREIGN PATENT DOCUMENTS

| 187865 | 6/1906 | Fed. Rep. of Germany ...... 416/197 |
| 1258615 | 1/1968 | Fed. Rep. of Germany ... 73/861.79 |
| 1518151 | 7/1978 | United Kingdom ................ 416/197 |

*Primary Examiner*—Herbert Goldstein
*Attorney, Agent, or Firm*—Ronald J. Paglierani

[57] ABSTRACT

A turbine flowmeter includes a rotor within a narrow-profile housing, the rotor having an axis of rotation aligned perpendicularly to the direction of fluid flow. The rotor employs a pair of oppositely directed, semi-cylindrical rotor elements disposed on either side of the axis of rotation, arranged in a generally rectangular configuration. Each element has a high drag front surface and a low drag back surface, the elements being twisted with respect to the axis so that at least a portion of a high drag surface is presented continually to the incoming fluid stream. Due to the wide disparity in drag between the front and back surfaces, and this twisted orientation, there is produced a continuous unidirectional net driving torque acting on the rotor, to prevent the occurrence of a null point, despite counter-resistance offered by the fluid. Furthermore, the gradually curving rotor protrudes minimally beyond the housing, and is able to rotatively adapt itself to the narrow spacing between pipe flanges. This effectively permits the insertion of the flowmeter into a space whose width is no greater than the width of the flowmeter housing alone. The placement of bearing surfaces and rotation-sensing instrumentation outside of the fluid flow facilitates maintenance of the flowmeter.

19 Claims, 11 Drawing Figures

VERTICAL AXIS TURBINE FLOWMETER

BACKGROUND OF THE INVENTION

The present invention relates in general to the field of fluid-driven impellers, and in particular to those suitable for use in turbine flowmeters in which the axis of rotation is transverse to the direction of fluid flow.

Turbine flowmeters have a long established reputation for extremely accurate measurements of fluid flow rates, along with high rangeability, typically in the range of 10 to 1 or greater. In a turbine flowmeter the impact of a fluid stream on the blades of a turbine rotor produces rotation at a frequency proportional to the volumetric flow rate of the fluid. To date, the majority of turbine flowmeters used in industry are of the axial type, in which the axis of turbine rotation is generally parallel to the direction of fluid flow through a pipe or conduit. However, the benefits normally attributable to turbine flowmeters in general are offset by several significant drawbacks in the case of the axial type flowmeter. The size of the axial flowmeter rotor offers a substantial amount of blockage to fluid flow and creates a significant pressure drop, to reduce greatly the efficiency of fluid transfer through the pipeline. For larger pipeline diameters, the diameter of the turbine rotor correspondingly increases to span the larger distance. Typically the length of the flowmeter, i.e., in the direction of fluid flow, increases as well, due to hydrodynamic considerations, to allow for velocity profile conditioning of the fluid stream before it contacts the rotor blades. In other words, larger pipe size diameters generally require longer, more cumbersome and more costly turbine flowmeters.

The unavoidable presence of the rotor bearing surfaces within the potentially corrosive fluid stream means that elaborate fluid seals are needed to protect the bearings against premature deterioration. The presence of the bearings inside the conduit also precludes maintenance or replacement of the bearings without interrupting fluid flow and removing the flowmeter from the pipeline. All of the above disadvantage mean greater material and operating costs, so much so that for larger pipe sizes, such as twenty-four inches and larger, the cost of an axial turbine flowmeter makes their use impractical. Also, the extended length of the typical axial meter makes it difficult for it to be usable as a replacement for a narrow profile flowmetering installation, such as, for example, an orifice plate-differential pressure (d/p) cell combination.

For a variety of reasons, vertical axis turbine flowmeters, in which the rotor rotates about an axis oriented transversely to the flow of fluid, have not attained the degree of popularity enjoyed by axial flowmeters.

Earlier transverse axis flowmeter designs typically used a "squirrel-cage" type rotor or similar configurations in which multiple blades or rotor elements were distributed evenly about the central axis. Some designs included flow-diverting mechanisms to insure that fluid was being directed onto the rotor elements in such a way as to produce a continuous driving torque regardless of the orientation of the elements. Such arrangements were used probably because the viscosity of fluid typically causes considerable resistance to rotor movement, and unless the rotor were subjected continually to a driving force sufficient to overcome this resistance, it would reach a null position and stop rotating. These arrangements also make the rotor self-starting regardless of its initial orientation relative to the incoming fluid stream. However, such bulky rotor configurations unnecessarily add to the overall dimensions of the flowmeter, and so suffer from the same limitations as the axial-type meters, regarding replacement in a narrow profile installation.

Therefore it is an object of the present invention to achieve continuous flow-rate-proportional rotation of a vertically aligned flowmeter rotor element, in a minimum of longitudinal space.

It is a further object of the present invention to provide a turbine flowmeter capable of directly replacing an orifice plate within a pipeline.

It is yet another object of the invention to provide a turbine flowmeter which yields an accurate indication of average fluid flow within a pipeline without creating a significant pressure drop or loss of pumping efficiency.

It is another object of the invention to permit placement of turbine meter rotor bearings and rotation sensors outside of the fluid stream to facilitate maintenance and replacement thereof.

It is a further object of the invention to achieve the foregoing with a minimum of material and manufacturing costs.

SUMMARY OF THE INVENTION

A fluid-driven rotary device, built in accordance with a preferred embodiment of the present invention, has a support frame, and a rotor assembly mounted on the support frame so as to accommodate rotation about an axis transverse to the direction of the flow of fluid. The rotor assembly includes a pair of rotor elements disposed on opposite sides of the axis, each element having both a front surface characterized by a high drag coefficient and a back surface characterized by a low drag coefficient. The rotor elements are further configured such that for any rotational position of the rotor assembly about the axis, at least one of the rotor elements presents a portion of its front surface toward the flow of fluid. The relationship between the high drag coefficients and the low drag coefficients is such that the impact of the flow of fluid on that portion of the front surface always produces unidirectional rotation of the rotor assembly about the axis, despite the impact of the flow on the back surfaces.

In another embodiment of the invention, a narrow-profile, vertical axis turbine flowmeter employs a rotor assembly having semi-cylindrical rotor elements, positioned on opposite sides of the axis of rotation, and arranged in a generally rectangular configuration. The elements are mutually curved or twisted with respect to the axis so that a concave surface of at least one element always faces into the incoming fluid stream. Despite its curvature, the front-to-back thickness of the rotor assembly at any point along its length, i.e., in the direction parallel to the axis, is essentially equal to the thickness of the narrow flowmeter housing, and so the rotor projects only minimally beyond the confines of the housing. This configuration allows the flowmeter to be inserted into a narrow gap in a pipeline, such as would normally accommodate an orifice plate, while the rotor assembly rotatively self-adjusts so as to continually align its front-to-back thickness with the housing thickness.

Modified rotor configurations also are presented which offer operating advantages in specific flowmeter applications.

BRIEF DESCRIPTION OF THE DRAWINGS

The numerous operating features and advantages of the present invention will be made clear by the following detailed description, in conjunction with the accompanying drawings in which.

DESCRIPTION OF THE PREFERRED EMBODIMENTS

Figure 1:
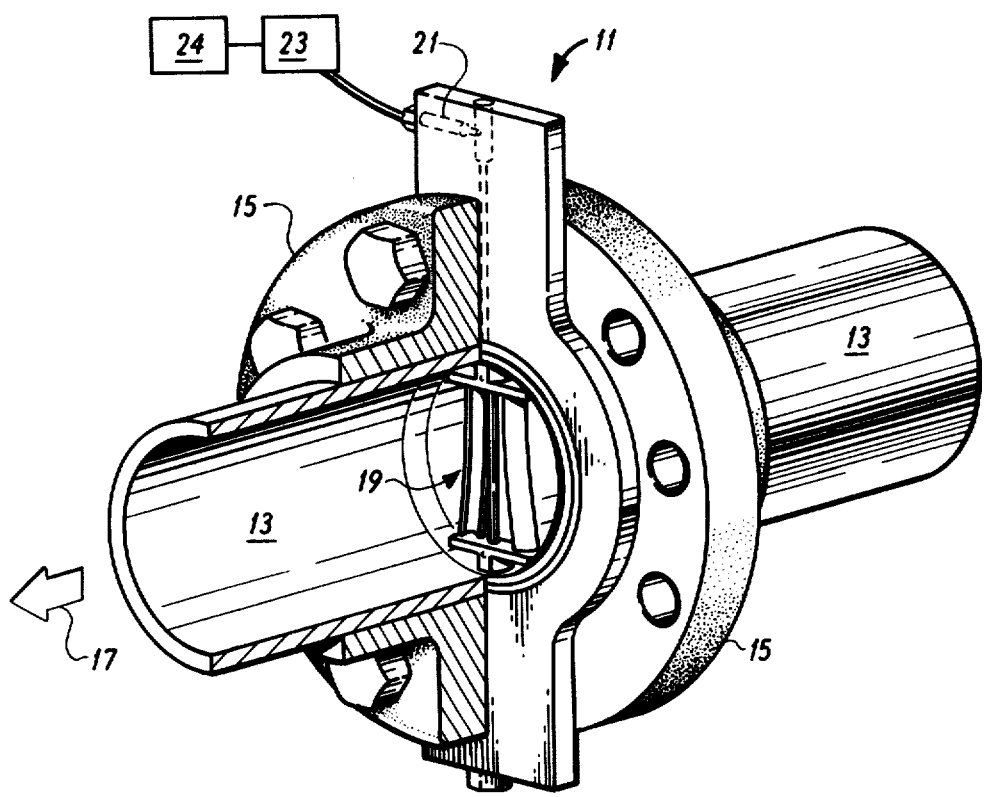
FIG. 1 is a perspective view, in cutaway, of a vertical-axis turbine flowmeter in accordance with the present invention, as installed in a fluid-carrying pipeline.

In FIG. 1 a vertical axis turbine flowmeter 11 is shown as typically installed between fluid-bearing pipeline sections 13. Flange assemblies 15, such as are used for mounting standard orifice plates, are attached to inwardly facing ends of each pipe section 13, and hold the flowmeter securely in place by contact pressure. Other conventionally known mounting schemes also may be used to suit a particular installation.

Described in quite general terms, a stream of fluid, proceeding through the pipeline 13 in a direction indicated by an arrow 17, impinges on a rotor assembly 19, to cause the rotor to rotate at a rate proportional to the volumetric flow rate of the fluid. An external sensor 21, hereinafter described in greater detail, detects the rotations and supplies an output signal to electronic circuitry 23, which converts the signal into an indication of the fluid flow rate, readable on a display device 24.

Figure 2:
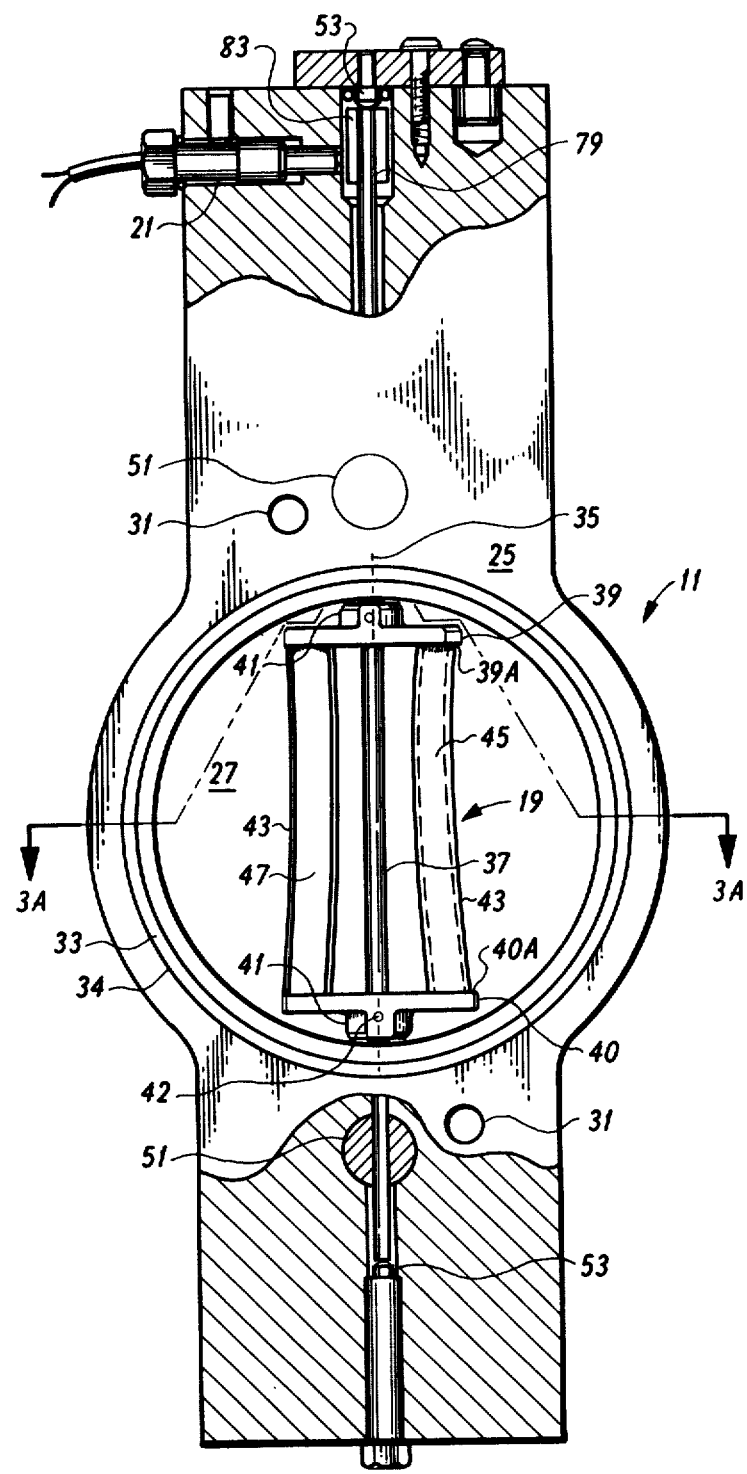
FIG. 2 is a front elevation view of the flowmeter of FIG. 1.

With reference now to both FIGS. 1 and 2, the flowmeter 11 includes a housing 25, made from a flat plate of a structurally rigid, corrosion resistant material, such as stainless steel. Typical thicknesses of the housing 25 are in the range of ¼ to ½ inch, comparable to the thickness of a standard orifice plate with gaskets. A circular opening 27, located at the center of the housing 25, has an inside diameter which corresponds exactly to the inside diameter of the pipeline sections 13 between which the flowmeter is installed. Alignment holes 31, corresponding to similar holes (not shown) provided on the pipeline section flanges 15, insure that at the time of installation the central opening is aligned properly with respect to the center opening of the pipelines. O-rings 33, seated within respective grooves 34, encircle the opening 27 on either side of the housing 25 to aid in forming a fluid-tight seal between the housing and the pipe section flanges 15.

The rotor assembly 19 is mounted within the opening 27 for rotation about a vertical central axis 35. In the illustrated embodiment a central rotational shaft 37, lying on the axis of rotation, passes entirely across the central opening 27, passing at either end into the housing 25. The rotor assembly 19 has a top and a bottom transverse support piece 39, 40 respectively, each of which pieces has a central hub 41 which engages the central shaft at a location adjacent the housing 25. The hub is fixed to the shaft by means of a set screw 42. Although in this embodiment the shaft passes entirely across the central opening 27, other rotational support arrangements also can be envisioned, such as, for example, an arrangement in which each of the transverse support pieces is coupled respectively to separate top and bottom shafts, with each shaft terminating at its inward end at the transverse support piece and not extending further across the central opening.

The rotor assembly 19 further includes two elongated, vertically extending rotor elements 43 which bridge the two transverse support pieces 39, 40, the elements being disposed in symmetric fashion on either side of the axis 35. The elements, made from a corrosion resistant material, are attached rigidly at both ends to the support pieces 39, 40 by an appropriate bonding technique. Although the rotor elements in this embodiment are shown as being identical in size and shape, such identity is not essential for proper operation of the invention.

Each of the rotor elements 43 shown in this embodiment has a generally semi-cylindrical shape, in that a cross section taken at any point along the rotor length yields a semi-circle. However, the element is not technically a true semi-cylinder because it has a specific type of twist incorporated in it, as will be described hereinafter in more detail, and so does not have a straight central axis. However, since the final shape of the rotor element as used in the illustrated embodiment can be produced by starting out with a true semi-cylindrical piece and twisting it, the geometrical shape of the rotor element 43 will be referred to hereinafter as semi-cylindrical, for the sake of convenience. Being semi-cylindrical, each of the rotor elements 43 by definition has an outer, or back, surface 45 which is convex in shape (See also FIG. 3A). Accordingly, the inner, or front, surface 47 is concave, being the reverse side of the convex back surface 45. Clearly, the surface area of the concave surface is essentially the same as that of the convex surface.

The concave front surface 47 can be characterized as having a high-drag coefficient, that is, it offers a considerable resistance to the passage of fluid. In contrast, the convex back surface 45 appears considerably more streamlined than the concave front surface 47, and so can be characterized as having a lowdrag coefficient. For convex and concave surfaces having the same radius of curvature, as in the present case, and facing directly into the flow, typical high- and low-drag coefficients are, respectively, 2.30 and 1.20 (coefficient values obtained from *Fluid Dynamic Drag*, Sighard F. Hoerner, 1965, page 3-17). The ratio of high-drag to low-drag coefficient is approximately 1.9 to 1. The general law governing the relationship between the drag force D produced on a rotor element subjected to a fluid stream, and the drag coefficient $C_D$ of that element is expressed by $$D = \tfrac{1}{2}\rho V^2 C_D S$$

where $\rho$ is the fluid density, $V$ is the fluid velocity and $S$ is the amount of rotor surface area having the specified drag coefficient (ref. Hoerner, supra). Therefore, the impact of the fluid stream on a section of the rotatively mounted rotor element 43 having its concave, high-drag front surface facing directly into the flow generates a high rotation-producing torque than does the impact of the same fluid stream on an identical section of rotor element having its convex surface area fully exposed. Theoretically, 1.9 times as much torque is generated in the case of the 1.9 to 1 drag coefficient ratio.

In the embodiment of FIG. 2, the two rotor elements are oriented in generally opposite directions, that is, the right-hand rotor element has its concave front surface 47 facing into the plane of the paper while the left-hand element has its concave front surface 47 facing outwardly toward the viewer. Naturally, their respective back surfaces also are oriented in opposite directions. With such a configuration, a flow of fluid directed toward the viewer produces a clockwise rotation of the rotor assembly 19, as viewed from above. This is due to the higher torque being developed on the right-hand rotor element than on the left-hand element, for the reasons mentioned above. Naturally, the torque on the right-hand element also must be sufficient to overcome the overall resistance due to the fluid itself.

The rotation of the rotor assembly 19 correspondingly causes rotation of the center shaft 37 as well, due to the rigid connection between the transverse support pieces 39, 40 and the shaft. The shaft 37 is supported for rotary movement within the housing 25 by bearings 51, and its longitudinal movement is limited at either end by thrust bearings 53. Since the bearings 51 are external to the fluid flow, they are easily accessible for repair, maintenance or replacement.

In the orientation shown in FIG. 2 the rotor assembly 19 presents an appreciable amount of concave high-drag surface to the incoming fluid stream (toward the viewer), i.e., almost the entire concave front surface 47 of the right-hand rotor element. The impact of the fluid stream on this surface is sufficient to begin rotary motion, despite the simultaneous impact of the fluid on the convex surface area of the left-hand element. In fact, the design of this rotor causes it to be subjected continually to a positive net torque, tending to maintain unidirectional rotation in the same direction, despite the fluid resistance and the counter-rotating torque generated by the fluid impacting on the left-hand rotor element.

The previously mentioned curvature, or twist, of the rotor elements 43 is instrumental in achieving a continuous net driving torque. In FIG. 2 the top and bottom transverse support pieces 39, 40 have inwardly facing planar surfaces 39a, 40a aligned parallel to one another, but, as shown more clearly in FIG. 3A, each of the pieces 39, 40 occupies a different rotational position about the shaft 37. In the view shown in FIG. 3A, the top support piece 39 is rotated 45 degrees with respect to the bottom support piece 40, about the shaft 37. Since the top and bottom ends, 55, 56 respectively, of each rotor element 43 are fixedly attached to, respectively, the top and bottom transverse support pieces 39, 40, then the top end 55 of each rotor is also displaced or twisted by 45 degrees of rotation from its bottom end 56. Preferably the twist occurs uniformly along the length of each rotor element, i.e., by a constant number of degrees per unit length. One can understand how such a twist can be incorporated if he visualizes a perfectly rectangular rotor assembly in which two identical semi-cylindrical rotor elements are disposed symmetrically about the central axis, although facing in opposite directions, with the transverse support pieces being not only parallel with respect to their inwardly facing surfaces but also having no angular displacement therebetween. If each transverse support piece is twisted in opposite directions about the axis until one piece has been displaced 45 degrees with respect to the other, the rotor assembly 19 shown in FIGS. 2 and 3A results.

Although a rotor assembly in accordance with the present invention indeed can be fabricated in such a manner, as a practical matter more efficient manufacturing techniques may be used, such as, for example, casting an entire rotor assembly as a single unit.

Figure 3A:
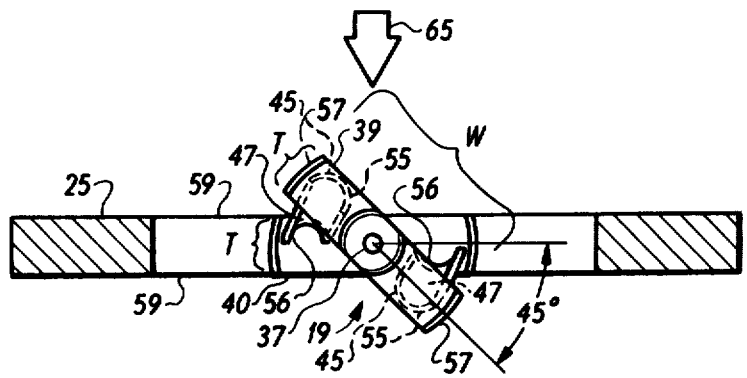
FIG. 3A is a top view, partly in section, of the rotor element of the flowmeter of FIG. 2, as viewed in the direction 3A—3A.

As shown in the overhead view of FIG. 3A, the twist results in radially outward ends 57 of the support piece 40 extending to a certain extent beyond the vertical outer surfaces 59 of the flowmeter housing 25. However, by making the front-to-back thickness T of the rotor assembly 19, at each point along the rotor's length, equal to or less than the thickness of the housing 25, this protrusion is minimal. The protrusion is considerably less than that which would be obtained if a third non-coplanar rotor element were added to an untwisted rotor assembly to accomplish the same objective sought by the imposition of the twist, i.e., to continually present a concave surface into the incoming fluid stream.

Figure 3B:
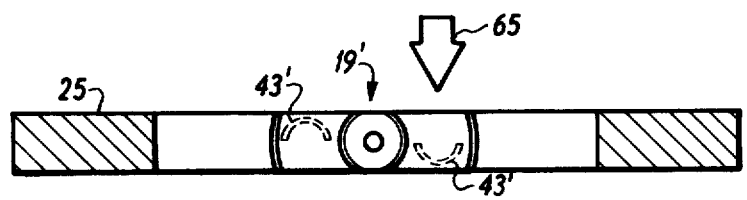
FIG. 3B is a top view of a non-twisted prior art rotor, at the same rotational position as the rotor in FIG. 3A.
Figure 4A:
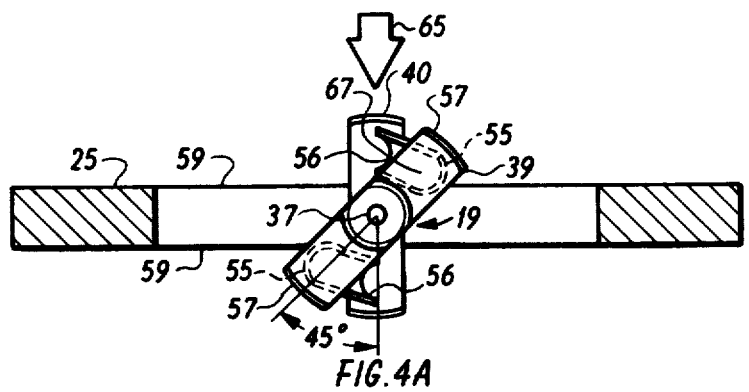
FIG. 4A is a top view, similar to that of FIG. 3A, showing the rotor at a different rotational position.
Figure 4B:
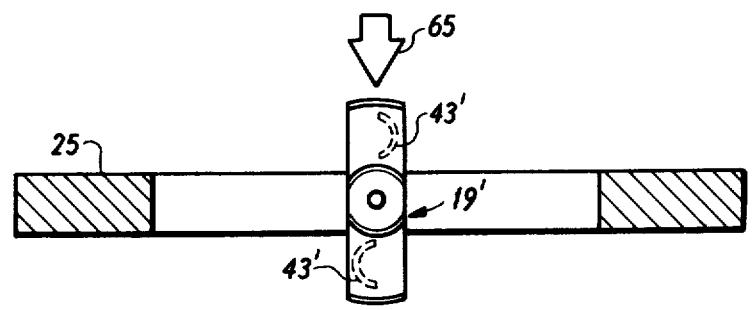
FIG. 4B is a top view of a non-twisted prior art rotor, at the same rotational position as the rotor in FIG. 4A.

In the orientation of FIG. 3A, it can be seen readily that the incoming fluid stream, whose direction of flow is indicated by arrows 65, is presented with a considerable amount of concave rotor surface area, comparable to the amount of concave surface area which would be presented by an untwisted, prior art version of the rotor assembly 19', as in FIG. 3B. (Elements indicated by primed reference numerals in the untwisted rotor of FIG. 3B correspond to similar elements having unprimed reference numerals in the twisted rotor of FIG. 3A). However, once the rotor rotates 90 degrees clockwise, to the position indicated in FIG. 4A, the advantage of the twisted rotor over the untwisted rotor becomes apparent. In the untwisted version of FIG. 4B, no portion of either concave front surface 47' is directed into the incoming fluid stream. Assuming that there are no local perturbations of the fluid stream to give a flow of fluid in a direction other than the principal direction of flow, indicated by the arrows 65, the simultaneous torques developed by the interaction of the fluid with the two rotor elements would be equal and opposite, and produce no net driving force and therefore no rotation. The untwisted rotor of FIG. 4B can be said to have reached a null or dead point. Even assuming, for the sake of argument, that there are laterally oriented, or swirling, flows of fluid, it is unlikely that these random flows can produce any rotation in view of the significant resistance to rotation offered by the fluid. With reference to FIG. 4A, however, the twisted rotor assembly 19 of the present invention presents a portion 67 of the concave front surface into the direction of flow, to maintain rotation in the same direction that the rotor 19 is proceeding.

It should be pointed out at this time that merely insuring that a portion of the concave, high-drag surface is continually presented to the fluid stream does not by itself guarantee that there will be a sufficient net torque to continue rotating the rotor in the same direction. Rather, continuity of rotation depends on the proper combination of the disposition of the rotor assembly and the drag coefficients of the individual rotor elements. Clearly, as the rotor rotates, and different aspects of each rotor element's concave and convex surfaces are presented to the direction of flow, the effective drag coefficient of each element is correspondingly changed. The high-drag and low-drag coefficients previously described as being applicable to ideal semi-cylindrical concave and convex surfaces respectively do not strictly apply when a rotor element exposes portions of both its convex and concave surfaces to the fluid stream at the same time. Thus, the effective drag coefficient for such a situation is somewhere between these two ideal values. Nevertheless, the cooperation of the rotor assembly configuration and the effective drag coefficients achieved by the present invention insures a unidirectional rotation, regardless of rotor orientation.

An explanation can be given of how the illustrated embodiment achieves this result, by reference again to FIG. 3A. Rotation of the rotor assembly 19 is due to a net excess of torque about its axis of rotation. For rotation to continue in a single direction, torque produced by the fluid stream must predominate on the same side of the axis, for any orientation of the rotor assembly about the axis. Since in this embodiment the rotor elements 43 are disposed symmetrically about the axis, the difference in torques is directly proportional to the difference in the drag forces exerted on the respective portions of the rotor assembly.

With the rotor twist shown in FIG. 3A, the rotor element to the right of the axis has its concave surface facing almost directly into the fluid stream, while the rotor element to the left has its convex surface so facing. As discussed above, the drag forces on each rotor element are equal to $\frac{1}{2}\rho V^2 C_D S$, and, since the term $\frac{1}{2}\rho V^2$ is the same for both rotor portions, the difference in drag forces is dependent only on the difference in their respective products $C_D S$. It is apparent that the product $C_D S$ is greater on the right-hand side of the axis, since the surface areas are essentially equal, while the high-drag coefficient is substantially greater than the low-drag coefficient. This accounts for the clockwise rotation of the rotor. It can be shown that for any rotational position of the rotor assembly 19, for example the position shown in FIG. 4A, the product $C_D S$ always predominates on the right-hand of the axis and so always produces clockwise rotation.

This arrangement also insures that the rotor shall be self-starting, regardless of its orientation at the time the fluid stream begins. If the proper combination of twist and drag coefficients is established to achieve a predominance of torque on a given side of the axis of rotation, then it is not absolutely necessary that the two rotor elements be identical in size or shape, as long as each element has a clearly distinguishable high-drag surface and an oppositely directed low-drag surface.

Figure 5:
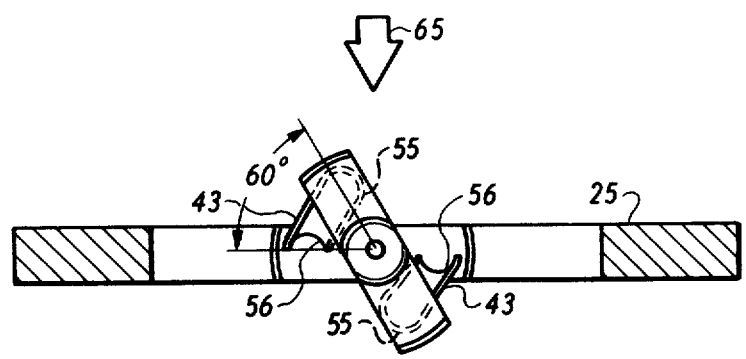
FIG. 5 is a top view, similar to FIG. 4A, showing a rotor having a greater degree of twist.

In the embodiment of FIGS. 3A and 4A, the amount of rotor twist specified is 45 degrees, since experimentation has indicated that a minimum of approximately 45 degrees yields acceptable results. But, experimentation indicates that even greater angles of twist yield satisfactory results as well. As shown in FIG. 5, a rotor having 60 degrees of twist displays the same characteristic as does the rotor of FIG. 4A, namely that for any rotational position of the rotor 19 with respect to the fluid flow direction, at least a portion of one concave front surface faces into the fluid flow.

Figure 6:
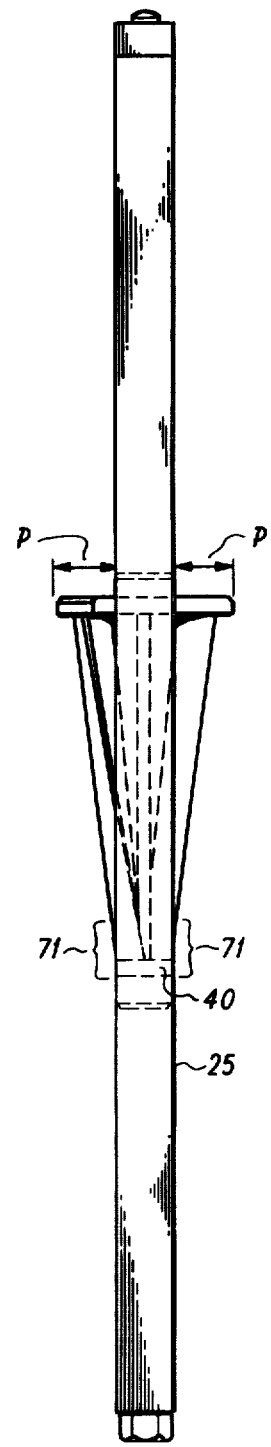
FIG. 6 is a side elevation view of the flowmeter of FIG. 1.

Referring to FIG. 6, if the bottom transverse support piece 40 of the rotor assembly is aligned so as to be totally within the confines of the flowmeter housing 25 (as in FIG. 2), the twisted rotor elements gradually taper outwardly, beyond the edges of the housing, to a maximum protrusion P at the top end of the rotor. Yet, due to the gradual twist of the rotor, there actually is a finite section 71 of the rotor assembly directly above the bottom support piece 40 which also lies completely within the confines of the housing. The length of the section 71 depends on the structural details of a particular rotor assembly, including, for example, the point of attachment of the rotor elements on the transverse support pieces, and the thickness of the rotor elements relative to the thickness of the support pieces. In any event the existence of the section 71 occurs, to a greater or lesser degree, on each rotor built in accordance with the present invention. As the rotor assembly rotates, the position of the section 71 effectively moves progressively upward along the length of the assembly. As long as the length of the section 71 is comparable in size to the height of a restriction through which the flowmeter must pass during installation, the rotor assembly can continuously rotate to allow passage of the flowmeter as a whole through a restriction which is no greater than the thickness of the housing alone. In other words, the rotor assembly can rotatively adapt so as to protrude beyond the flowmeter housing only in locations where it is not opposed by a solid obstacle.

Figure 7:
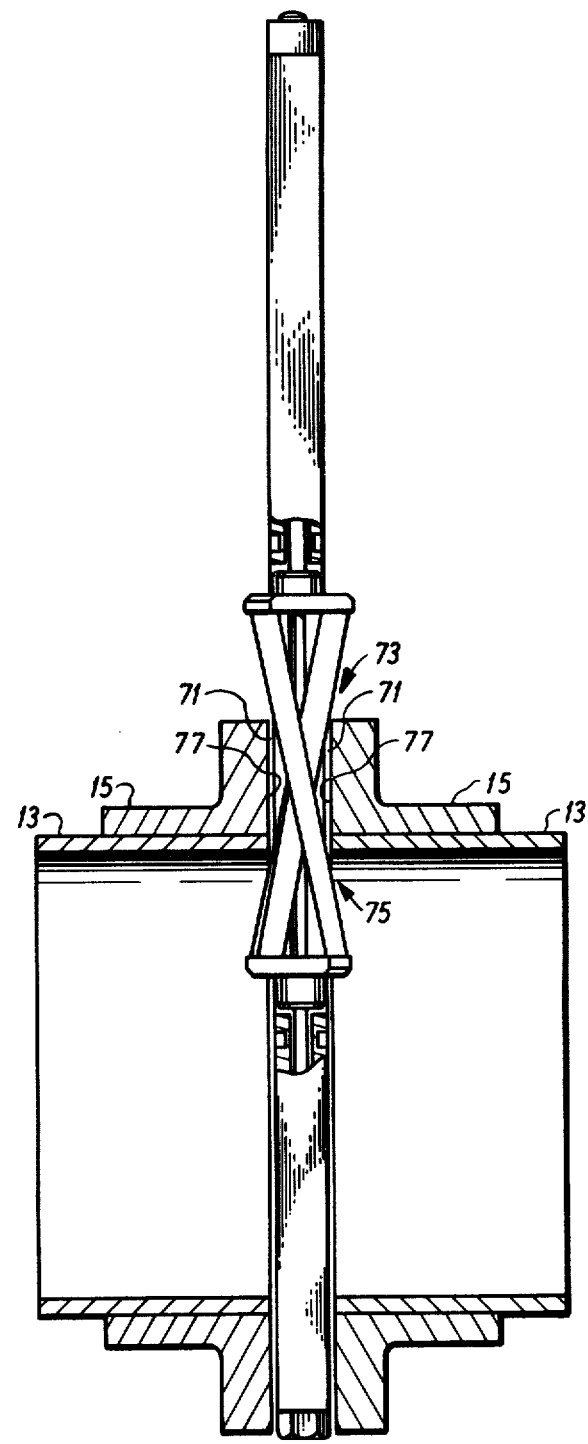
FIG. 7 is a side elevation view, partially in cutaway, showing an intermediate position of the flowmeter as it is being lowered into position within a pipeline.

The typical context in which this situation arises is when the flowmeter is installed between the two opposing sections of pipeline 13. As shown in FIG. 7, each section has the flange 15 circumferentially disposed about its central opening. One of the controlling factors in determining whether a flowmeter according to the present invention can be inserted directly into a narrow opening between the two flanges is the height of the flange itself, that is, the distance from the inside diameter to the outside diameter of the flange. This is a controlling factor because in the regions 73 and 75, above and below the flange respectively, the rotor can protrude without any impediment whatsoever. If the height of the flange is sufficiently small to allow the section 71 of the rotor to pass through the confined area between the flanges before the rotor is forced to rotate by the vertical walls 77 of the flanges pushing against the twisted surfaces of the rotor, then the entire flowmeter can be lowered into its normal installed position between the pipe sections. However, if the flange height is significantly greater, and the flange walls try to rotate the rotor while the rotor is still being impeded by other portions of the flange walls, then the rotor will present an insurmountable obstacle to further insertion of the flowmeter. In such a situation, the only recourse is to pull the pipe sections further apart to allow passage of the protruding rotor assembly, which generally means additional downtime and expense.

The latter situation generally exists with smaller diameter pipes having a diameter of four inches or less. This is because for all pipes below this critical diameter the flange height must remain constant at a minimum value, so as to provide sufficient structural strength for coupling to the adjacent pipe sections. Since the rotor assembly is required to twist through at least approximately 45 degrees across the relatively short length of the rotor, there is a high degree of curvature per unit length of the rotor. This permits the protruding rotor assembly to pass only between relatively short pipe flanges. However, since the pipe flange cannot be reduced to a height smaller than the minimum allowable value, the high degree of curvature of the rotor precludes passage between the disproportionately high flanges.

Figure 8:
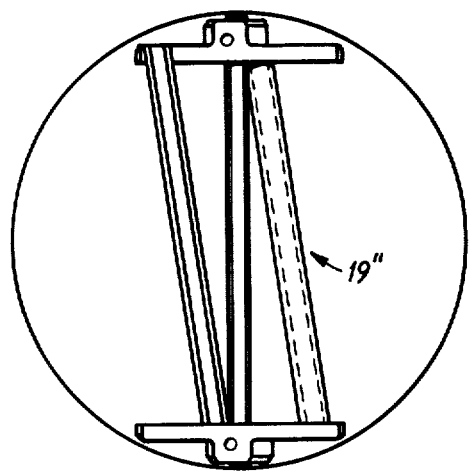
FIG. 8 is a detail elevation view of an alternate, parallelogram-shaped rotor assembly.
Figure 9:
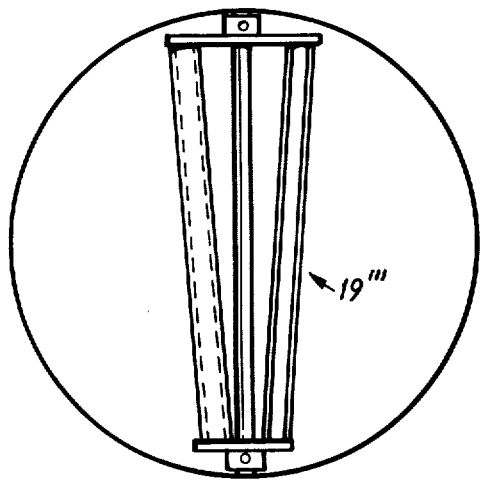
FIG. 9 is a detail elevation view of an alternate, trapezoidal rotor assembly.

In the case of such small pipe diameters, there are alternatives to requiring greater separation between pipes in order to install a vertical axis turbine meter of the present design. Since an object of the invention is to be able to insert the flowmeter into a space vacated by an orifice plate, further separation of the pipes may not be a practical reality. Therefore, given a maximum thickness of the flowmeter housing which can be accommodated in any typical situation, one alternative is to lessen the front-to-back thickness T of the rotor at each point along its height, and also to shorten its width W (see FIG. 3A), until no portion of the rotor assembly protrudes beyond the housing across the entire width of the circular opening 27. In so doing, however, a rotor assembly having the generally rectangular shape discussed above with reference to FIGS. 1 and 2 would have a reduced moment arm due to the shortening of the rotor-to-rotor distance. To counteract this loss of moment arm, different rotor configurations are offered. With reference to FIG. 8, a rotor assembly 19" having a general parallelogram shape instead of the rectangular shape has a greater increased moment arm than does the rectangular version of the same width, at certain vertical positions. This compensates somewhat for the loss due to the shortening of the rotor-to-rotor distance. With reference to FIG. 9, a trapezoidal rotor 19''' also has advantages in some situations, and can compensate partially for the loss in moment arm. It must be remembered that the terms parallelogram and trapezoid are not technically correct in all respects because the rotor is not a purely planar or flat body but is twisted. However, if one considers the shape the rotor would assume in an untwisted state, the use of the terms rectangle, parallelogram and trapezoid are still valid for reference purposes.

With reference again to FIG. 2, a top end 79 of the shaft 37, which is far removed from the fluid flow, is positioned adjacent the magnetic rotation sensor 21, which counts the number of rotations of the shaft per unit time. A flag 83, made of a magnetic material and fixed to circumferential wall of the shaft 37, passes near to the sensor with each rotation of the shaft. The sensor uses magnetic coupling to detect the recurring passage of the flag. A typical arrangement of this kind can be found in use in the Foxboro Model 81 Turbine Flowmeter. Such an arrangement produces a pulse output signal, which is readily adaptable for use in digital control systems. It also can be converted, using conventionally available electronic circuitry, into an analog output signal to drive an appropriately configured indicator device such as a meter. An alternative to this magnetic pickup system is an optical sensing system utilizing, for example, fiber optic technology to detect passage of a reference mark on the shaft. However, many other schemes for determining the rotation of the shaft would be apparent to one skilled in the electronic design art, and the usage of any particular technique is not critical to the operation of the present invention. What is needed is the inclusion of circuitry to relate the rotation of the shaft to the volumetric flow rate of the fluid producing this rotation, to insure accurate representation of the fluid flow rate at the final output indicator.

A vertical axis turbine flowmeter in accordance with the present invention has several distinct advantages. The rotor assembly disclosed in the preferred embodiment extends across the entire diameter of the pipe, yet, because of the essentially unobstructed opening between the two rotor elements, it presents considerably less blockage to fluid flow than would either a solid rotor element or the bulky rotor configuration of an axial type turbine meter. By extending across the entire pipe diameter, the rotor also is subjected to fluid flow both near the surface of the pipe wall as well as at the interior regions. Therefore the rotation of this rotor is indicative of the average overall flow rate of the fluid rather than merely an atypical localized flow rate. The placement of both the rotor shaft bearing surfaces and the rotation sensor outside the fluid flow insures that maintenance of these items may be accomplished without disturbing fluid flow or requiring major disassembly of the flowmeter from the pipe section.

Although the description of the present invention has been done with reference to an embodiment having a vertical axis, the invention functions equally well for other orientations of the axis, as long as the axis remains transverse to the fluid flow direction. For example, a horizontal axis may be preferable in the case of a fluid containing suspended solids, since the heavy solids would tend to sink to the lower portion of the pipe, and moving the axis to a horizontal position eliminates a potential debris-collecting site at the bottom of the pipe.

For larger pipe diameters, although the length of the rotor must increase correspondingly to bridge the entire diameter of the pipe, there should be no appreciable increase in the thickness of the rotor assembly, i.e., in the direction parallel to fluid flow. Some increase in thickness may be required for structural strength of the rotor, but no increase is required by velocity-profile conditioning considerations, as would be the case with the axial type flowmeters. Therefore the narrow profile of the flowmeter, and its ability to be installed as a replacement for an orifice plate, are maintained for all pipe sizes.

Although the present invention has been described in terms of the preferred embodiment shown in the accompanying figures, certain modifications and changes will become apparent to those skilled in the art. For example, while the invention has been described primarily in the context of a fluid flowmeter, the rotor assembly design can be used effectively as a wind-driven impeller in a windmill. Nevertheless it is intended that such modifications be encompassed within the scope of the following appended claims.

What is claimed is:

1. Apparatus for measuring the flow rate of a fluid stream within a conduit, comprising:
support means mountable within said conduit;
an impeller assembly rotatably mounted on said support means for rotation about an axis and suspended within said fluid stream, said axis being transverse to the direction of flow of said fluid stream through said conduit, said impeller assembly including
a pair of impeller elements disposed symmetrically about said axis, each of said elements having diametrically opposed surfaces characterized by a high-drag coefficient and a low-drag coefficient respectively, said impeller elements being twisted uniformly about said axis such that a first straight line passing through said axis and the respective top ends of said elements defines an acute angle with a second straight line passing through said axis and the respective bottom ends of said elements, whereby for any rotational position of said impeller assembly about said axis, at least one of said impeller elements presents a portion of its high drag surface toward said fluid stream;

means for sensing the rate of rotation of said impeller assembly at a location external to said conduit; and means for relating said rate of rotation to the flow rate of said fluid stream.

2. Apparatus for measuring the flow rate of a fluid stream within a conduit, comprising:

support means mountable within said conduit;

an impeller assembly rotatably mounted on said support means for rotation about an axis and suspended within said fluid stream, said axis being transverse to the direction of flow of said fluid stream through said conduit, said impeller assembly including a pair of fixed semicylindrical impeller elements disposed symmetrically about said axis, the inner concave surfaces of said elements facing in diametrically opposite directions, said impeller elements being twisted uniformly about said axis such that the top end of each element is circumferentially displaced by fewer than 90 degrees about said axis from its respective bottom end, whereby for any rotational position of said impeller assembly about said axis, at least one of said impeller elements presents a portion of its inner concave surface toward said fluid stream;

means for sensing the rate of rotation of said impeller assembly at a location external to said conduit; and means for relating said rate of rotation to the flow rate of said fluid stream.

3. Apparatus for measuring the flow rate of a fluid stream within a conduit, comprising:

support means mountable within said conduit;

an impeller assembly rotatably mounted on said support means for rotation about an axis and suspended within said fluid stream, said axis being transverse to the direction of flow of said fluid stream through said conduit, said impeller assembly including a pair of semicylindrical impeller elements disposed symmetrically about said axis, the inner concave surfaces of said elements facing in diametrically opposite directions, said impeller elements being twisted uniformly about said axis such that a first straight line passing through said axis and the respective top ends of said elements defines an acute angle with a second straight line passing through said axis and the respective bottom ends of said elements, whereby for any rotational position of said impeller assembly about said axis, at least one of said impeller elements presents a portion of its inner concave surface toward said fluid stream;

means for sensing the rate of rotation of said impeller assembly at a location external to said conduit; and means for relating said rate of rotation to the flow rate of said fluid stream.

4. Apparatus as set forth in claim 3 wherein said acute angle is at least approximately 45 degrees.

5. Apparatus as set forth in claim 4 wherein a section of said impeller assembly along its length always lies within the confines of said support means, said section changing position along the length of said impeller assembly as said impeller assembly is rotated.

6. Apparatus as set forth in claim 3 wherein said impeller elements are disposed to produce a rectangular impeller assembly.

7. Apparatus as set forth in claim 3 wherein said impeller elements are disposed to produce a parallelogram-shaped impeller assembly.

8. Apparatus as set forth in claim 3 wherein said impeller elements are disposed to produce a trapezoidal impeller assembly.

9. Apparatus as set forth in claim 3 further comprising:

a rotational shaft fastened to said impeller assembly and aligned parallel to said axis, said shaft being rotatably mounted to said support means;

a magnetic member attached to said shaft; and wherein said sensing means comprises a magnetic pickup which detects the passage of said magnetic member.

10. Apparatus as set forth in claim 3 further comprising: a rotational shaft fastened to said impeller assembly and aligned parallel to said axis, said shaft being rotatably mounted to said support means; and wherein said sensing means comprises optical means disposed to detect the rotation of said shaft.

11. Apparatus for measuring the flow rate of a fluid stream within a conduit, comprising:

a thin housing adapted to be mounted within said conduit;

a rotational shaft means, including a magnetic portion, said shaft means being rotatably mounted to said housing and being transverse to the direction of flow of said fluid stream through said conduit;

an impeller assembly attached to said shaft means for rotation therewith and suspended within said fluid stream, said impeller assembly including a pair of semi-cylindrical impeller elements disposed symmetrically about said shaft means, the inner concave surfaces of said elements facing in diametrically opposite directions, said impeller elements being twisted uniformly about said shaft means such that a first straight line passing through said shaft means and the respective top ends of said elements defines an acute angle with a second straight line passing through said shaft means and the respective bottom ends of said elements, whereby for any rotational position of said impeller assembly about said shaft means, at least one of said impeller elements presents a portion of its inner concave surface toward said fluid stream;

magnetic pickup means for detecting the passage of said shaft means magnetic portion so as to sense the rate of rotation of said impeller assembly; and means for relating said rate of rotation to the flow rate of said fluid stream.

12. Apparatus as set forth in claim 11 wherein said impeller elements are located at positions radially equidistant from said shaft means.

13. Apparatus as set forth in claim 12 wherein said acute angle is at least approximately 45 degrees.

14. Apparatus as set forth in claim 13 wherein the thickness of said impeller assembly at each point along its length is no greater than the thickness of said housing.

15. Apparatus as set forth in claim 14 wherein a section of said impeller assembly along its length always lies within the confines of said housing, said section changing position progressively along the length of said impeller assembly as said impeller assembly is rotated.

16. Apparatus as set forth in claim 11 wherein said impeller elements are disposed to produce a rectangular impeller assembly.

17. Apparatus as set forth in claim 11 wherein said impeller elements are disposed to produce a parallelogram-shaped impeller assembly.

18. Apparatus as set forth in claim 11 wherein said impeller elements are disposed to produce a trapezoidal impeller assembly.

19. A rotary device suitable for insertion in a narrow gap between sections of conduit, comprising:

a narrow profile housing;

support shaft means rotatably mounted to said housing and positioned generally parallel to the longitudinal axis thereof; and an impeller assembly attached to said shaft means for rotation therewith, said impeller assembly being twisted about said shaft means such that the respective top and bottom ends of said impeller assembly are angularly offset from one another about said shaft means;

the degree of angular offset being such that a section of said impeller assembly in the longitudinal direction always lies within the confines of said narrow profile housing, and said section changes position progressively along the length of said impeller assembly as said impeller assembly is rotated.

* * * * *